(12) United States Patent
Gupta et al.

(10) Patent No.: US 8,295,863 B1
(45) Date of Patent: Oct. 23, 2012

(54) MULTIMEDIA ENHANCED SERVICES (75) Inventors: Diwakar Gupta, Seattle, WA (US);
Chih-Jen Huang, Kirkland, WA (US);
Gerald Yuen, Pasadena, CA (US);
Philip Yuen, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 987 days.

(21) Appl. No.: 12/247,161

(22) Filed: Oct. 7, 2008

(51) Int. Cl.
*H04W 4/00* (2009.01)
*H04M 3/16* (2006.01)
*H04M 3/42* (2006.01)
*G06Q 30/00* (2006.01)

(52) U.S. Cl. .............. 455/466; 455/411; 455/414.1; 705/26.1; 705/26.81; 705/27.1

(58) Field of Classification Search .............. 455/466, 455/411, 414.1; 705/26.1, 26.81, 27.1
See application file for complete search history.

(56) References Cited

U.S. PATENT DOCUMENTS

2005/0245241 A1 * 11/2005 Durand et al. ............ 455/414.1
* cited by examiner

*Primary Examiner* — Ariel Balaoing
(74) *Attorney, Agent, or Firm* — Lee & Hayes, PLLC (57) ABSTRACT

Techniques for providing information to users implemented through personal mobile devices such as cell phones, PDAs, electronic book readers, and other such devices are described herein. The described techniques and systems allow users to request searches, perform information seeking, purchasing, or other types of transactions with a provider via a mobile or wireless network using the messaging service capabilities of the users' mobile devices. Messages may be compiled in a manner customized to a user request and may be provided without the user authenticating to the provider in some instances.

16 Claims, 6 Drawing Sheets

MULTIMEDIA ENHANCED SERVICES

BACKGROUND

Increasingly, people would like to utilize mobile devices in commercial and information-seeking transactions. Recently, texting via short messaging service (SMS), alternately referred to as "simple message service," has become a popular format for social and commercial communications. However, limitations imposed by the SMS protocol sometimes hamper dissemination of rich details in SMS texts. Therefore, the current practice of sending multiple text messages to communicate more in-depth information sometimes fails to provide a satisfying user experience.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

This disclosure is directed to techniques and systems for conducting transactions implemented through personal mobile devices such as cell phones, PDAs, electronic book readers, and other such devices. The described techniques and systems allow users to request searches, perform information seeking, purchasing, or other types of transactions with a provider via a mobile or wireless network using the messaging service capabilities of the users' mobile devices. Messages may be compiled in a manner customized to a user request and may be provided even before the user authenticates with the provider.

The architecture presented as an example herein illustrates a user operating a mobile device to send a text message, such as via SMS, referencing a search item to a provider to engage in a transaction with the provider. SMS messages are limited to 160 characters. Yet, in many situations it is desirable to communicate more rich information than 160 characters allows. For example, the provider may need or want to respond with a communication that includes more than 160 textual characters, images, audio, video, or combinations of these types of communication. Such rich information may be presented via a multimedia messaging service message, for example via a multimedia messaging service such as MMS, mobile chat, or the like.

The provider may leverage a transaction processing service (not shown) for processing the transaction or a transaction authorization service (not shown) for authorizing the transaction. In some instances, the provider and/or one or more of these services may output a message via a multimedia messaging service message that includes information about a search item, for example. This multimedia messaging service message may be specific to the user and may be provided before the user authenticates with the provider.

The techniques described herein may be implemented in a number of contexts. Several examples are described below. It is to be appreciated, however, that the described techniques may be implemented in a vast array of other contexts and environments.

Illustrative System Architecture

Figure 1:
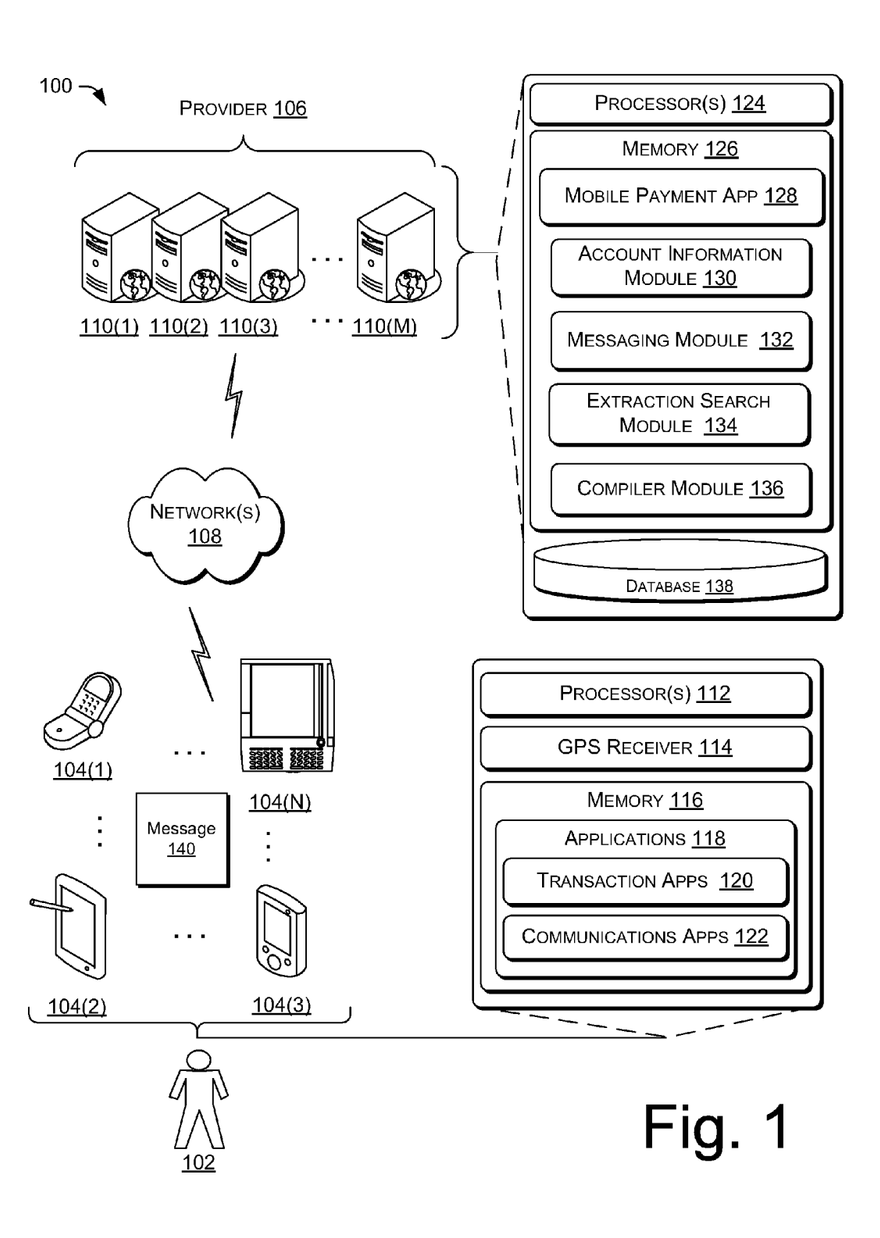
FIG. 1 illustrates an example architecture for providing information including information regarding commercial transactions to a user via a mobile device.

FIG. 1 illustrates an example architecture 100 in which the claimed techniques may be implemented. Here, the techniques are described in the context of a user 102 operating a mobile device 104 to send a request using a messaging service to a provider 106 through a network 108. In many implementations and transactions, device 104 is a personal wireless communications devices such as a cell phone, a smart phone, personal digital assistant (PDA), an electronic book reader, or other such device. Some types of mobile devices might also be used by or associated with provider, to allow for payment transactions between a user and a provider. Furthermore, provider 106 may be associated with a merchant or may be a merchant. Provider 106 may also be associated with a transaction processing service or may be a transaction processing service.

Illustrated network 108 is representative of many different types of networks, such as mobile telephone networks, wired networks, and wireless networks, or combinations of such networks.

Although FIG. 1 shows only one user and four examples of mobile devices 104(1)-104(N), one or more mobile devices may correspond with a particular user, and provider 106 may communicate with a large number of users through users' personal mobile devices. Furthermore, the overall system or network might include a number of different providers, operating cooperatively or independently.

Provider 106 may comprise one or more servers 110(1), ..., 110(M), perhaps arranged as a server farm. Other server architectures may also be used to implement provider 106. Provider 106 is capable of handling requests from many users and serving, in response, various information and data to the users. Provider 106 may also include or have access to a transaction processing service configured to manage requested transactions. The servers 110 are capable of facilitating interaction by the mobile devices 104 between user 102 and the user's financial institutions via the network 108 and other communications paths.

The mobile devices 104 may be implemented in a number of ways. The mobile devices 104 are those which are capable of wireless communications using cellular networks, wireless network access points, and other communications technologies. Various other types of mobile devices are also capable of utilizing the described techniques: portable gaming devices, video/audio recording devices, electronic book readers, and other portable electronic or entertainment devices, including both personal devices and merchant-related devices.

In one illustrative implementation, the mobile devices have some degree of location awareness: they are able either to report their own locations or to report information that can be used to deduce their locations. For example, the mobile device may identify the nearest cell phone tower or wireless access point. This enables provider 106 to reference a database indicating the location of the identified tower or access point, from which the location of the mobile device can be roughly determined.

Certain components of a mobile device 104 are shown in FIG. 1. For purposes of discussion and illustration, these components of a mobile device include one or more processors 112, a GPS receiver 114, and memory 116 to store data and applications 118 such as one or more transaction applications 120 and one or more communications applications (e.g. messaging applications) 122 that interact with the user of the mobile device and with provider 106 to request, facilitate, and accept messaging transactions. In this case, location awareness is enabled by GPS receiver 114. However, other techniques for determining location could be used, such as determining a proximity of the mobile device 104 to one or more cellular base stations and/or WiFi base stations.

Provider 106 employs one or more servers 110(1), ..., 110(M) comprising at least one processor 124 and memory 126 to store data and applications. Examples of applications stored by the provider include a mobile payment application 128, an account information module 130, a messaging module 132, an extraction search module 134, and a compiler module 136. Database 138 may also store a variety of different types of data and content. Although illustrated in FIG. 1 as a single database operably coupled to memory 126, database 138 may also be at least partially contained in memory, or maintained separate from memory 126 and may comprise more than one database. Provider 106 is capable of handling requests from many users and serving, in response, various messaging content that can be rendered at user mobile device 104 for viewing by user 102. For instance provider 106 may serve a message 140 to mobile device 104. Message 140 may comprise a variety of types of content, such as images, audio, video, multimedia, graphics, and text. Message 140 may communicate an item for sale, a user profile, a search result, a discussion forum post, or other content enabling user 102 to enter into a transaction with provider 106, and/or any other type of content.

Illustrative Operation

Figure 2:
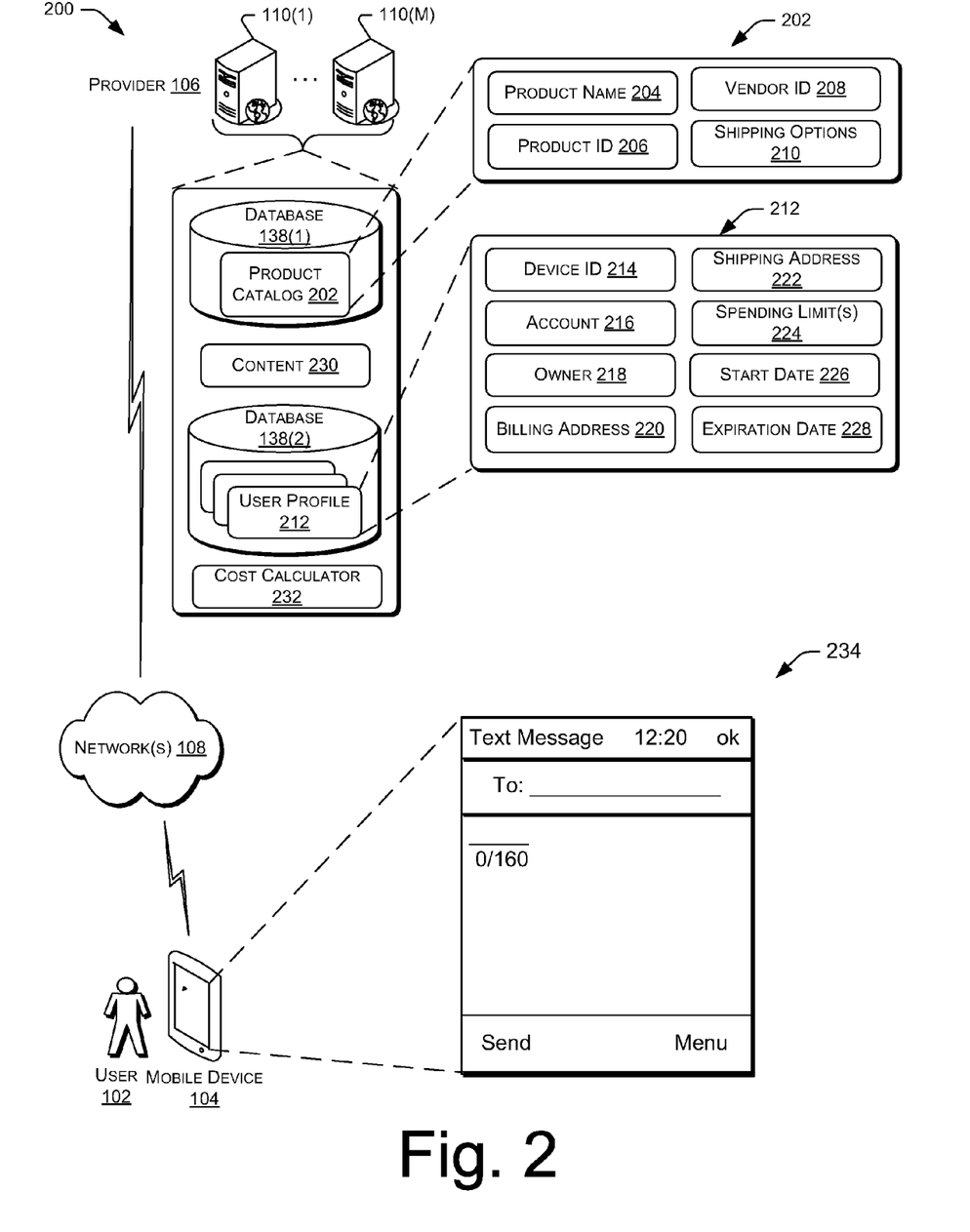
FIG. 2 illustrates an embodiment of a provider network including a product database to facilitate transactions with users having provider accounts.

FIG. 2 illustrates an illustrative environment 200 of a provider network facilitating multimedia enhanced services over multimedia messaging service (MMS). As discussed above, the one or more servers 110(1), ..., 110(M) of provider 106 comprise one or more databases. Although more or less than two databases are possible, FIG. 2 illustrates two databases: database 138(1) comprises product information maintained in a product catalog 202, and database 138(2) comprises user information maintained in user profiles 212. Product information maintained includes, for example, product name 204, product identifier 206, vendor identifier 208, and shipping options 210; other information may also be maintained. User information includes information associated with a user, such as device identifier 214, account 216, owner 218, billing address 220, shipping address 222, spending limit(s) 224, start date 226 and expiration date 228; other information may also be maintained. Content 230, meanwhile, may comprise user provided content such as ratings and reviews. While the content 230 is illustrated separate from database 138(1) and 138(2), this content may additionally or alternately be maintained in one or more of databases 138.

The user profiles 212 are also associated with respective users' mobile devices 104 by way of uniquely identifying information supplied from the mobile devices. For example, the user of a mobile device might be asked to submit a user name and password in order to associate a mobile device with a particular account. Different means might alternatively be used to verify the identity of any particular mobile device, including cryptographic techniques and the transmission of device serial numbers or other identifying information associated with each device.

User 102 may initiate a transaction with provider 106 by sending a request, such as a text message via short message system (SMS). Illustrative screen 234 shows a screen from which user 102 may submit a request to the provider 106 from mobile device 104, for example using SMS. Provider 106, upon receiving the request from mobile device 104, may access a variety of sources of information such as databases 138, product catalog 202, and user profile 212.

Database 138 may further store of have access to a cost calculator, such as cost calculator 232. Details about a particular item or product offered for sale or consumption by a provider, such as provider 106 may be sent in response to a request, such as a request initiated via screen 234. In response to a request, cost calculator 232 may analyze a corresponding user profile 212 associated with the received device identifier 214, as well as a corresponding service provider profile, such as associated with provider 106.

For instance, cost calculator 232 may determine a shipping address associated with the received device identifier 214. Cost calculator 232 may then analyze shipping costs provided by the provider 106 for the purpose of determining a cost of shipping the item(s) to the shipping address associated with the mobile device 104. Cost calculator 232 may then calculate the cost of shipping the item if the item were purchased via the multimedia enhanced services over a multimedia messaging service. Furthermore, calculator 232 may use information associated with the received mobile device 104, such as a billing address, to determine tax-rate information based on the user profile 212. Based at least in part on this comparison, cost calculator 232 may calculate a sales tax for the item if the item were to be purchased via multimedia enhanced services over a multimedia messaging service. Cost calculator 232 may also determine other adjustments to purchase price, such as whether any promotions or discounts would apply, or if gift wrap fees should be applied in the event the item were purchased.

Based on compiling this information, cost calculator 232 calculates a fully-landed cost for an item or items if the item(s) were to be purchased via the multimedia enhanced services over a multimedia messaging service (e.g., MMS, mobile chat, etc.). Cost calculator 232 may then make this cost available to mobile device 104, provider 106 when cost calculator 232 is separate from provider 106, and/or to one or more other entities. In some instances, provider 106 sends this fully-landed cost to mobile device 104 for rendering as an image in an MMS message 140. Of course, if user 102 wishes to actually purchase the item, then provider 106 may require that user 102 be authenticated before completing the transaction. This is but one way the multimedia enhanced services over MMS enables a user or account holder 102 associated with the user profile 212 to make a payment request from the user's mobile device 104.

In some cases, a user 102 transmits a payment request in the form of a an SMS text message, an MMS message, or via other communications to provider 106. Other permissions or details may be necessary before the funds from the user 102 are transmitted to the provider 106. For example, a payment request may be referenced against a spending limit for the requesting account holder, and/or might require some sort of interactive authorization by the user 102—especially when using an unsecure communications media such as SMS.

An interactive authorization process might include transmitting an authorization request message from provider 106 to the user 102 via the user's mobile device 104. The authorization request message may use SMS, MMS, or a different communications media, other than the media of the original request, such as a voice automated message, an email, or some other form of communication.

In addition to authorizing an order, user 102 may be prompted or required to enter other information to complete the authorization. For example, responsive to a provider initiated request, such as a provider call to the mobile device, user 102 may be asked to enter a personal identification number (PIN) or password through the user interface of mobile device 104. According to one embodiment, for example, the user could input the PIN in an SMS or MMS message. In another embodiment, for example, the user could input the PIN using the tones associated with the touchpad of a telephone device. In other embodiments, the user may speak the PIN and/or other authorization information to an agent who then authorizes (or denies) the transaction. Note that the various described authorization procedures may be used alone or in combination, and some of the procedures may depend on the result of other procedures. In one embodiment, for example, the user may initiate the authorization procedure, such as by making a call or sending a text message from the mobile device such that the provider responds by prompting the user to perform one or more of the authorization actions described above. In one embodiment, both user and provider initiated authorization requests may occur within a transaction sequence.

Illustrative User Interfaces

Figure 3:
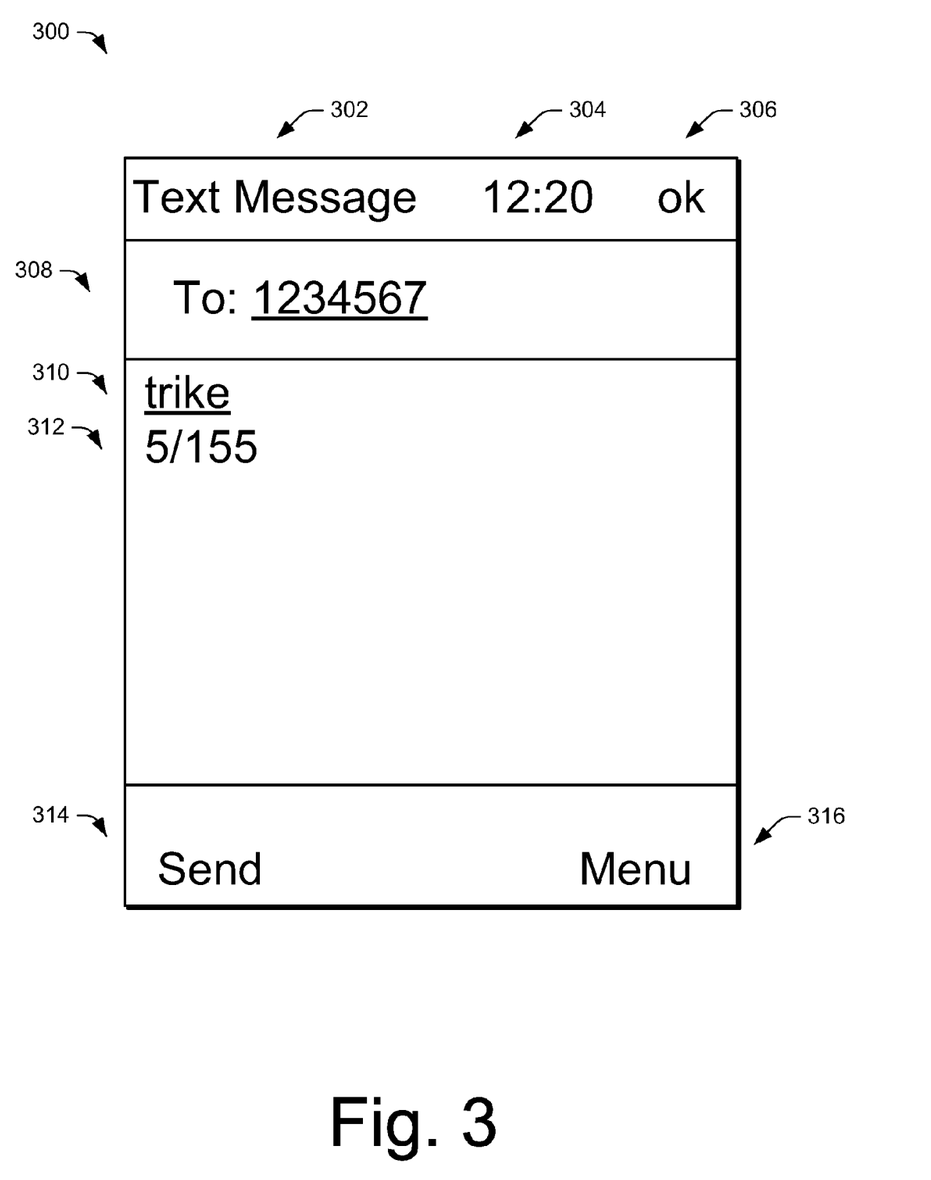
FIG. 3 illustrates an example rendering of a search request to be sent to a provider.

FIG. 3 illustrates an example visual display unit rendering 300 of a user interface for a request for information to be sent to provider 106 of FIG. 1 via mobile device 104. Service identifier 302 indicates that mobile device 104 is operating in SMS via the identifier "text message." Other indications may also be provided. For example, screen 300 here includes a time 304, as well as an icon 306 (entitled "ok") that provides an escape from the messaging service. Furthermore, screen 300 here includes an area 308 where user 102 enters the number of an entity to whom a text message should be sent, such as provider 106 for example. Screen 300 may further include an input area 310 in which user 102 may enter a word or phrase of interest. In this example, user 102 enters the term "trike" into input area 310.

In SMS messages, abbreviations (and, potentially, misspellings) are often used due to message length limitations, amongst other factors. Because of this prevalence and acceptance among users, multimedia enhanced services over a multimedia messaging service (e.g., MMS) accommodates such alternate entries. Note, in area 312, the display indicates that of the 160 characters allowed per message, five have been used by this entry and 155 remain available. Assuming this is the end of the example request, user 102 may send this request to provider 106 by selecting a send icon 314. At this point, user 102 may complete further text messages or may select a menu icon 316 to access other available services on mobile device 104.

Figure 4:
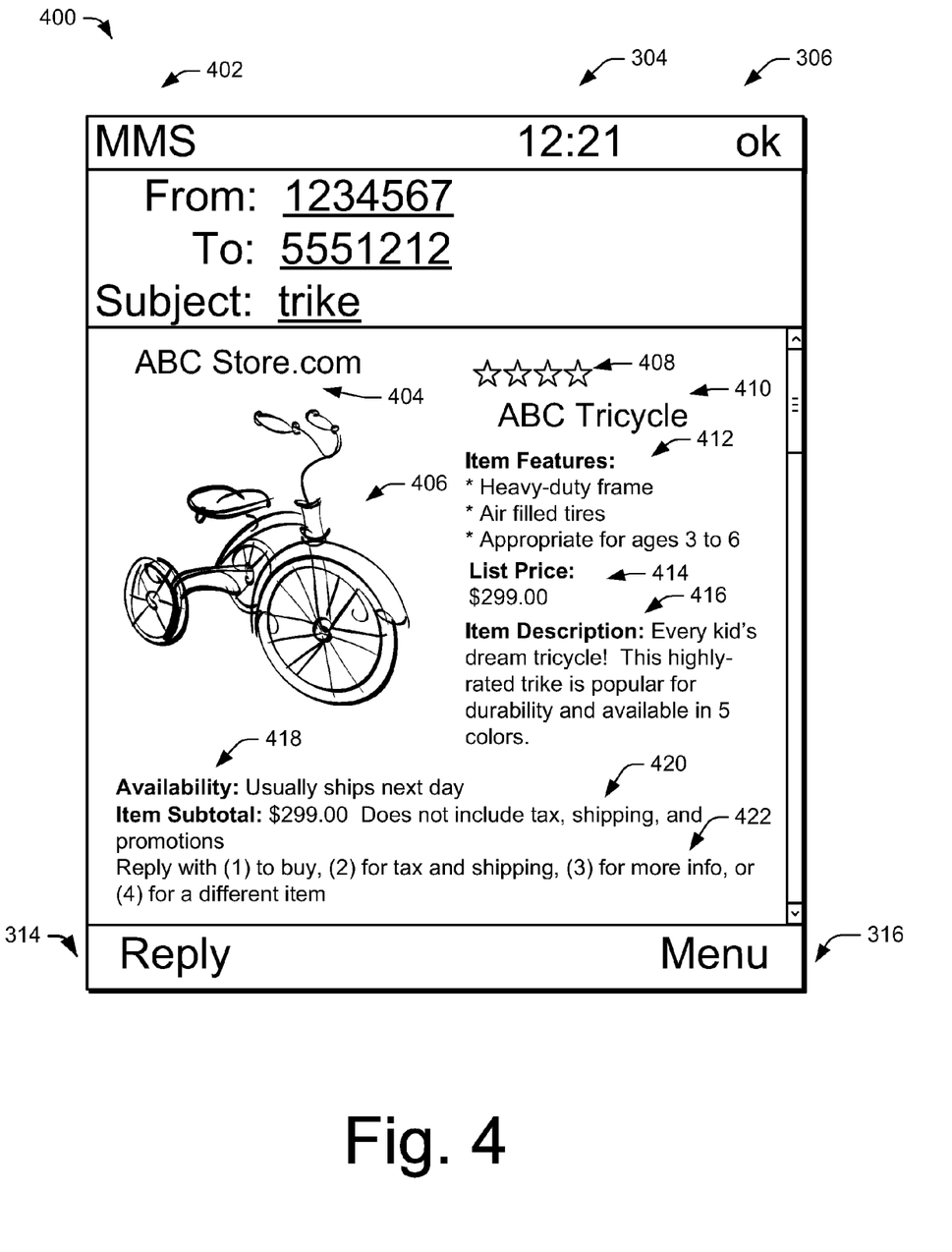
FIG. 4 illustrates an example rendering of a multimedia messaging service message sent from the provider in response to receiving the search request of FIG. 3.

FIG. 4 illustrates an example visual display unit rendering of a message user interface 400 on mobile device 104, which is served by provider 106 of FIG. 1 in response to receiving the request from user 102 as illustrated via the request for information 300 of FIG. 3. In some scenarios, the message user interface 400 may include audio or video instead of, or in combination with the image and/or text presented. Here, a service identifier 402 indicates that mobile device 104 is operating via multimedia messaging service as shown by the identifier "MMS." As discussed regarding FIG. 3, message user interface may 400 include a time 304, as well as an icon 306 that provides an escape from the messaging service.

Here, message user interface 400 includes information compiled in response to the example request "trike" as illustrated in FIG. 3. Although message user interface 400 is described in terms of multiple objects, in at least one implementation, the multiple objects may be embedded into a single message object for service to mobile device 104. In at least one implementation, message user interface 400 approximates the corresponding display of a web-page that would be presented to a user viewing the item through a relatively more interactive session, such as through a user's Internet browser accessing a web server of the provider. In the case of an item available for consumption by the user (e.g. purchase, lease, rental or borrowing), message user interface 400 may also include a vendor name object 404 determined at least in part based on vendor identifier 208 from FIG. 2. In at least one scenario items available for consumption are determined at least in part on availability of a particular physical item for shipment. In other scenarios items available for consumption may comprise information such as directions, maps, phone numbers, addresses, and other such information. Here, message user interface 400 also includes an item image object 406, illustrating a tricycle associated with product name 204 or product identifier 206 from FIG. 2, which is presented as embedded in message user interface 400. An image object compiled as a multimedia package based at least in part on content 230 from FIG. 2 and associated with the request "trike" is also included in message user interface 400.

Additional objects may be presented as embedded in message user interface 400. For example, objects determined based at least in part on product name 204 or product identifier 206 from FIG. 2 associated with the request "trike" such as an item name object 410, an item features object 412, an item price object 414, and an item description object 416 may be presented as embedded in message user interface 400. Additional objects such as an availability object 418 and a subtotal object 420 may be based at least in part on product name 204 or product identifier 206 from FIG. 2 and presented as embedded in message user interface 400. Different objects determined based on other criteria may alternately be included in message user interface 400.

In some instances, at least one object is determined based at least in part on dynamic rather than static sources. For example, merchandise items may be sourced from different vendors at different times, reviews may be added or updated, prices or shippers may change, or the like. Because one or more of the objects or sources from which the objects are derived are dynamic (e.g., 208, 230, 414, 210, 420), message user interface 400 may be dynamic and customizable. In other words, in at least one embodiment, message user interface 400 is not compiled and stored as an object for serving to devices 104. Instead, provider 106 may retrieve this information from various sources in response to receiving a request and may then compile and arrange this information into the message that is sent to device 104 and depicted in message user interface 400. In some embodiments, the compiled information (e.g. images, audio clips, video clips, etc.) is "stitched" or otherwise combined together into a single object for transmission to mobile device 104. The single object could be any type of multimedia object, such as a single image file, an audio file, and/or a video file. Although embodiments depicted herein contemplate the compilation of many image objects into a single image for transmission to the device 104, the same techniques can be used to provide customized audio and/or video information to the device 104.

Furthermore, in at least one embodiment, user 102 may customize the information in the message that is sent to mobile device 104 and displayed via the message user interface 400. In one embodiment, responsive to preferences indicated by user 102, provider 106 may perform text to speech conversion of item information, reviews, or other content and provide this customized package to mobile device 104. For example, user 102 may direct provider 106 to provide a particular number of reviews based on content 230 in addition to or instead of image object 408. In at least one embodiment, user 102 may direct provider 106 to provide a particular number of images 406 associated with items for purchase. In one implementation, these user customizable parameters may be determined in association with fees charged for messages (one or both of SMS and MMS), other fees associated with mobile device 104, or other criteria. For example, user 102 may indicate preferences in the SMS request message or by setting up profile information through the provider.

In some cases user 102 may specify rules such that the provider can provide customized messages for the user based on supplied criteria. For example, a user 102 might indicate that messages should not exceed a certain size (e.g. 50 KB). Provider 106 then uses this criteria to maximize the information that is compiled to be presented per message within this user defined parameter, such as by compressing or trimming images, limiting the number of reviews, presenting a particular arrangement of information, and so forth.

Additional customized information may be received at mobile device 104 and displayed within message user interface 400. This information may include, for example, customized tax and shipping information based on the location of the mobile device 104 or account 216 associated with mobile device 104 and may be reflected in subtotal object 420. Other customized information, such as personalized recommendations, billing and shipping addresses, user-specific notifications, and personalized advertisements can also be provided through the multimedia enhanced service.

Message user interface 400 may also provide additional transaction information via reply direction object 422. In the illustrated scenario, user 102 may send a reply text (1) to buy an item, in this case ABC Tricycle, (2) to receive tax and shipping information for the item, (3) to receive more information about the item. The additional information may additionally or alternatively include one or more corresponding types of information such as reviews, an expanded description, detailed shipping options, and so forth. In this scenario user 102 may also send a reply text (4) to receive a different rendering of message user interface 400 served by provider 106 of FIG. 1 in response to the request 300 of FIG. 3. As many different message user interface representations 400 may be provided as may include different information compiled in response to the example request "trike" as illustrated in FIG. 3. For example, different screens may be based on different associations made in product catalog 202, with product name 204, vendor identifier 208, etc. or combinations thereof.

Figure 5:
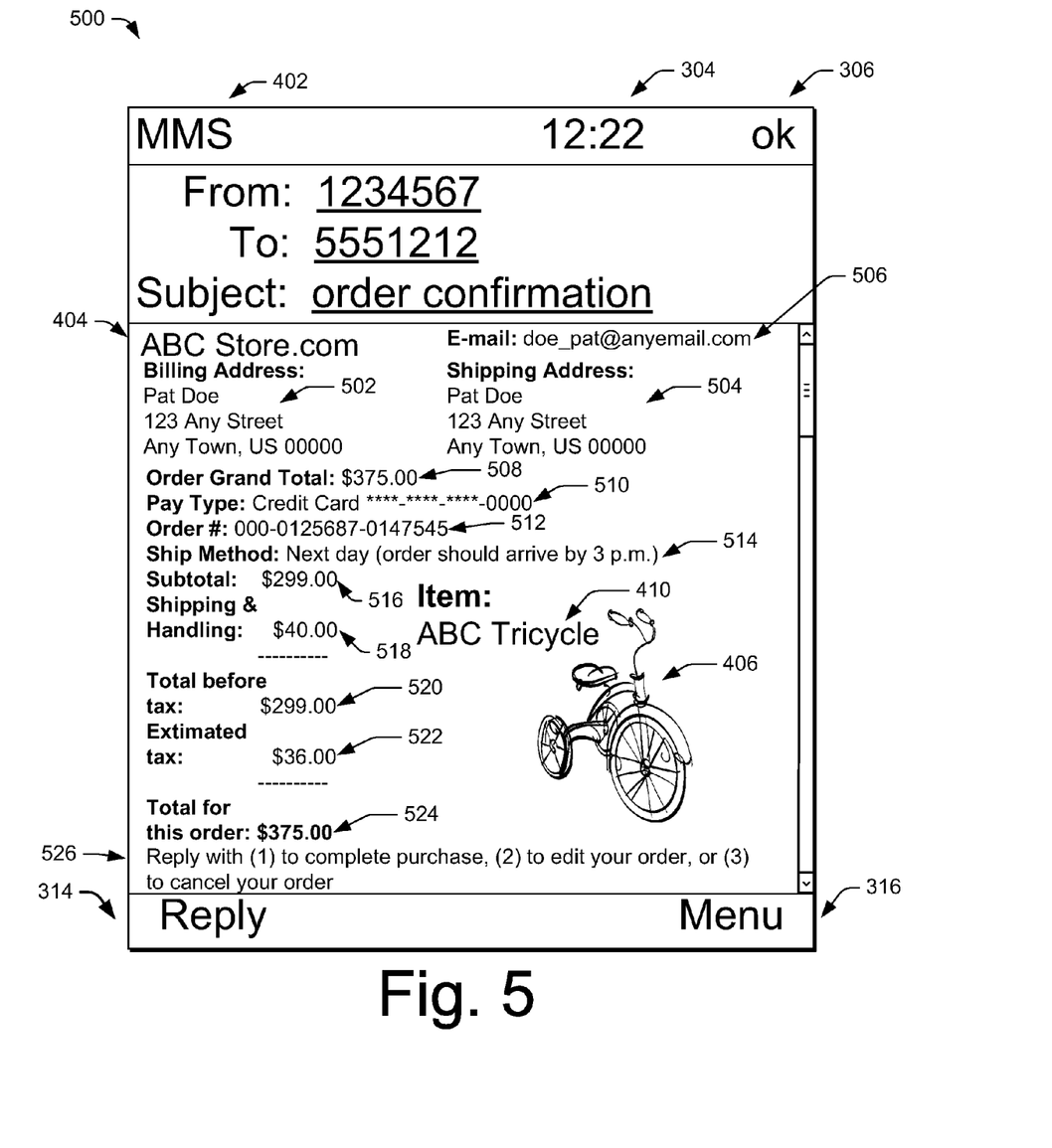
FIG. 5 illustrates another example rendering of a multimedia messaging service message sent from the provider.

FIG. 5 illustrates an example visual display unit rendering of confirmation message user interface 500 that provider 106 of FIG. 1 may serve in response to user 102 sending a reply text (1) from the message user interface 400 of FIG. 4. In the scenario of FIG. 5, rich communication is facilitated via multimedia enhanced services over a multimedia messaging service customized for mobile devices (e.g., MMS, mobile chat, etc.). Although user interface 500 is described in terms of multiple objects, in at least one implementation, the multiple objects are embedded into a single message object for service to mobile device 104.

Here, user interface 500 includes further information based at least in part on the reply text (1) indicating a user's 102 desire to buy the item illustrated in message 400 of FIG. 4. This information may include, for example, customized tax and shipping based on the location of the mobile device 104 or account 216 associated with mobile device 104 and/or information compiled in response to receiving the example request ("trike"). The illustrated message user interface 500, for instance, includes presentation of vendor name object 404, item image object 406, and item name object 410 introduced in FIG. 4. In addition, user interface 500 presents billing address 502 and shipping address 504 based on billing address 220 and shipping address 222, respectively, as associated with user profile 212 from FIG. 2. Alternately, user 102 may indicate different preferred addresses which after authentication may be presented for confirmation via user interface 500. An e-mail address 506 is but one example of an identifier that may be used to correspond to user profile 212.

FIG. 5 further illustrates order total object 508 determined based on, for example, preferences associated with owner 218 or account 216 of user profile 212 in combination with price object 414 from FIG. 4. In one embodiment, order total object 508 may have been estimated in subtotal object 420. In at least one embodiment an order for more than one item may be presented via user interface 500.

Pay type object 510 illustrates a preferred payment method and may be determined based on preferences associated with owner 218 or account 216 of user profile 212, and in at least one implementation in combination with additional services such as gift cards or discounts. Order number object 512 presents an order confirmation or tracking number to be associated with the presented transaction between user 102 and provider 106. Additional transaction details may be compiled from preferences associated with owner 218 or account 216 of user profile 212 and item object 410. Such additional transaction details may be presented, for example, as ship method object 514, transaction subtotal object 516, shipping and handling object 518, before tax object 520, and estimated tax object 522. In the example illustrated in FIG. 5, the information represented by order total object 508 is repeated at this order object 524 for presentation to user 102. Message user interface 500 also provides reply direction object 526. In the illustrated scenario, user 102 may reply text (1) to complete the purchase, (2) to edit the order before purchase, or (3) to cancel the order. In at least one embodiment, an order will not be fulfilled until the reply (1) is submitted and may further be time limited. Reply direction object 526 may also, for example, allow users 102 to determine complete purchase prices in casual shopping environments. Different objects determined based on other criteria may alternately be included in message user interface 500. In at least one implementation at least one object of message user interface 500 is determined based at least in part on dynamic sources.

In another embodiment, user 102 may request searches, perform information seeking, purchasing, or other types of transactions with provider 106 via mobile device 104 using the messaging service capabilities of mobile device 104. Responsive to such user requests, provider 106 may dynamically compile and package search results, directions, etc. in multimedia enhanced messages which may include dynamic creation of the message based on user customized preferences, as discussed above. For example, user 102 may request directions from one address to another address via a text message from mobile device 104. In response provider 106 may compile and package a single multimedia enhanced message that is then delivered to mobile device 104. The single multimedia enhanced message may include an image such as a map of a route and/or textual directions and/or aural directions packaged and delivered to mobile device 104 via the multimedia enhanced message based on user indicated preferences. In another scenario, user 102 may send a text message of a celebrity's name, a business name, or other search term to provider 106. In response, provider 106 may compile and package objects associated with the term such as images and text into a package deliverable as a single multimedia enhanced message that is then delivered to mobile device 104 based on user indicated preferences.

In yet another embodiment, user 102 may send a text message of a movie title or other event such as a concert, live theatrical performance, etc. to provider 106. In response, provider 106 may compile and package objects associated with the received text message, and in some instances customized information, as discussed above, into a package deliverable as a single multimedia enhanced message that is then delivered to mobile device 104.

In some scenarios, user 102 may expand transactions by replying to the multimedia enhanced message directing provider 106 to generate and send user 102 further search, more detailed, or purchase transaction information, for example, via a multimedia enhanced message to mobile device 104.

Illustrative Process

Figure 6:
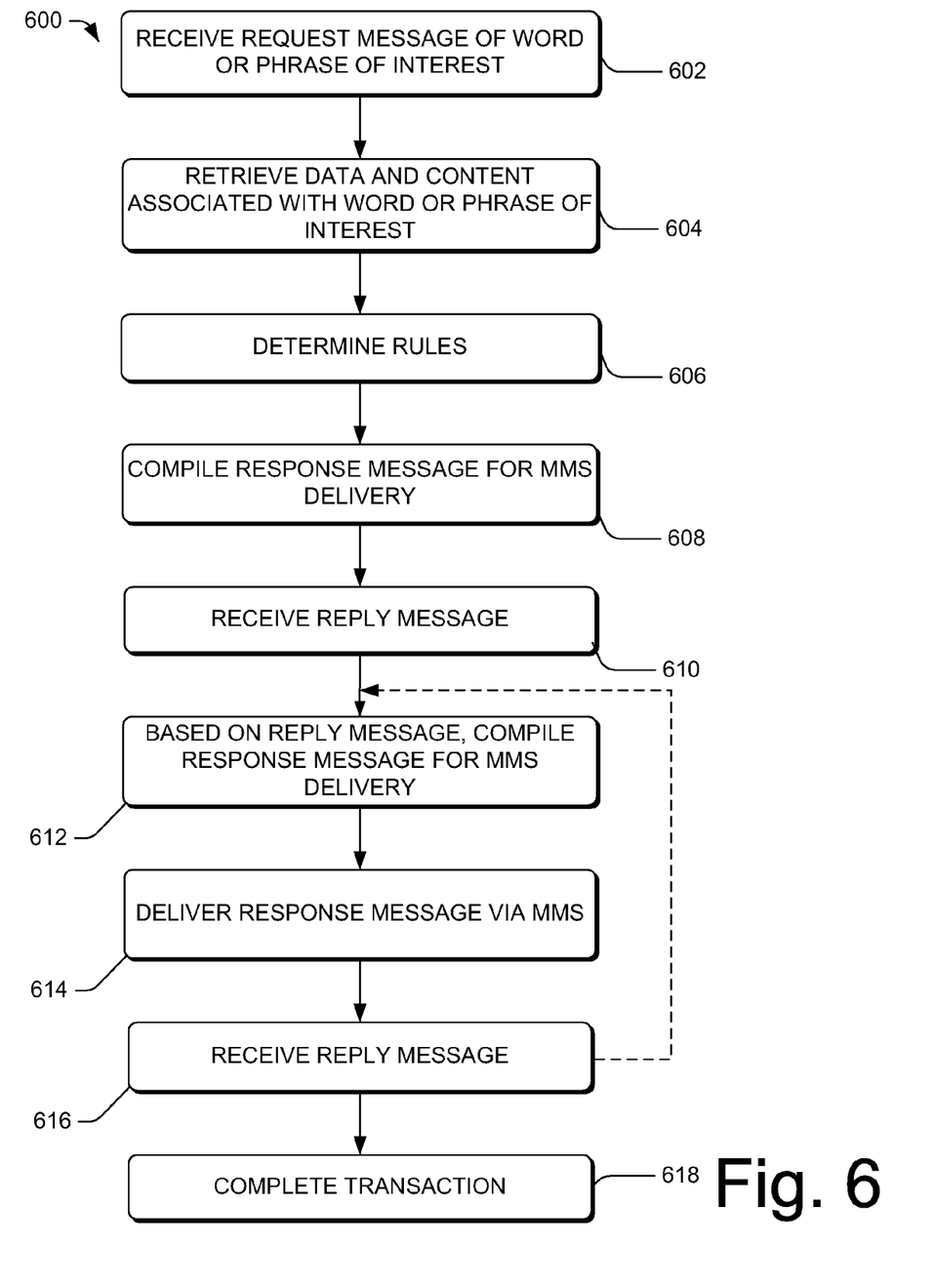
FIG. 6 is a flowchart of an illustrative process of compiling elements for inclusion in a multimedia messaging service message.

FIG. 6 illustrates an example process 600 that may be implemented by the architecture described in FIG. 1. This process is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Process 600 includes receiving, at operation 602, a request message 310 containing a word or phrase of interest entered by user 102 on mobile device 104 via SMS. Operation 604 retrieves data about an item associated with the received word or phrase of interest from product catalog 202 and additional information from content 230. Although the item may comprise an item for sale, it need not. Operation 606, meanwhile, represents determining rules associated with the particular mobile device 104, as well as information about an associated user 102 from user profile 212, if known. Operation 608 compiles a response message, such as message 400, for delivery via a multimedia messaging service, such as MMS, to mobile device 104.

Operation 610 receives a reply message to message user interface 400 entered by user 102 on mobile device 104. Operation 612 compiles another response message, such as message 500, for delivery via a multimedia messaging service to mobile device 104 responsive to the reply message received in operation 610. Alternately, operation 612 compiles a response message associated with reply message (2), (3), or (4) from message user interface 400. Operation 614 delivers a response message via a multimedia messaging service to mobile device 104 responsive to the reply message received in operation 610. Operation 616 receives a reply message to message user interface 500 entered by user 102 on mobile device 104. The multimedia enhanced services over a multimedia messaging service may continue to compile response messages for delivery to mobile device 104 responsive to messages entered by user 102 on mobile device 104, such as response messages associated with reply message (2), or (3) from message user interface 500. Operation 618 signifies completion of a transaction (e.g., end of a search session, end of a messaging session, or a purchase) by user 102 on mobile device 104. Other scenarios are possible, and as discussed above, authentication of mobile device 104 and/or user 102 may be completed before operation 612 or other operations.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
   receiving, at a merchant that offers items for acquisition, a text based request from a mobile device via a short message system (SMS) message, the text based request specifying an item offered for acquisition by the merchant;
   compiling, at least partly in response to receiving the text based request, information from a web-page associated with the item at the merchant;
   serving the information from the web-page via a multimedia messaging service (MMS) message to the mobile device;
   receiving, based at least in part on the MMS message, a request to acquire the item from the mobile device;
   authenticating the mobile device;
   generating a confirmation of the request to acquire the item; and
   serving the confirmation of the request to acquire the item via an MMS message to the mobile device.

2. A method comprising:
   receiving, by a merchant that offers items for acquisition, a text based request via a short message system (SMS) message, wherein the text based request originates at a mobile device;
   compiling, by the merchant, information from a web-page associated with the text based request; and
   serving, to the mobile device, the information from the web-page via a multimedia messaging service (MMS) message.

3. The method as recited in claim 2, wherein the text based request comprises a search for an item offered for acquisition by the merchant.

4. The method as recited in claim 2, wherein the text based request comprises a search for information.

5. The method as recited in claim 2, wherein the text based request comprises a search for dynamic content.

6. The method as recited in claim 2, wherein the information from the web-page comprises at least one of video content, audio content or text.

7. The method as recited in claim 2, wherein the compiling comprises:
   dynamically compiling the MMS message from the information from the web-page.

8. The method as recited in claim 2, further comprising:
   receiving user preferences defining customizable parameters for serving the MMS message to the mobile device; and
   delivering the information from the web-page via the MMS message service consistent with the received user preferences.

9. A method comprising:
receiving a request from a mobile device, the request specifying an item offered by a merchant; and
responsive to the receiving of the request, dynamically generating and providing an image via a multimedia message, wherein the image generated and provided via the multimedia message:
   approximates a web-page that corresponds to the item and that is for presentation on the mobile device; and
   comprises details from the web-page, the details dynamically retrieved responsive to the request.

10. The method of claim 9 wherein the generating comprises:
compiling, from multiple sources, information comprising multiple media types; and
converting at least one of the multiple media types to facilitate packaging the information for delivery via the multimedia message.

11. One or more computing device comprising:
one or more processors; and
memory having stored therein computer-executable instructions that upon execution configure the one or more processors to perform operations comprising:
   receiving a request from a mobile device, the request identifying an item offered for acquisition;
   responsive to the receiving of the request, generating an image to be provided via a multimedia message, wherein the image:
      approximates a web-page corresponding to the item and is configured for presentation on the mobile device; and
      comprises details from the web-page, the details dynamically retrieved responsive to the request; and
   providing the image via the multimedia message for presentation on the mobile device.

12. The memory of claim 11, wherein the request from the mobile device comprises a text based request via a short message system (SMS).

13. The memory of claim 11, wherein the web-page comprises at least one of video content, audio content or text on a corresponding interactive display.

14. The memory of claim 11, wherein the request comprises a search for a product.

15. The memory of claim 11, wherein the request comprises a search for information.

16. The memory of claim 11, wherein generating comprises:
compiling, from multiple sources, information comprising multiple media types; and
converting at least one of the multiple media types to facilitate packaging the information for delivery via the multimedia message.

* * * * *